United States Patent
Matsuba

(10) Patent No.: US 7,068,578 B2
(45) Date of Patent: Jun. 27, 2006

(54) INFORMATION RECORDING DEVICE, INFORMATION RECORDING METHOD, INFORMATION RECORDING PROGRAM, AND RECORDING MEDIUM

(75) Inventor: Takanobu Matsuba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/932,268

(22) Filed: Sep. 2, 2004

(65) Prior Publication Data

US 2005/0030795 A1  Feb. 10, 2005

Related U.S. Application Data

(63) Continuation of application No. PCT/JP2004/003916, filed on Mar. 23, 2004.

(30) Foreign Application Priority Data

Mar. 25, 2003 (JP) .............................. 2003-083360
Oct. 17, 2003 (JP) .............................. 2003-357396

(51) Int. Cl.
   *G11B 11/00* (2006.01)
(52) U.S. Cl. .................. 369/53.24; 369/53.41
(58) Field of Classification Search ............ 369/30.04, 369/30.07, 30.09, 47.22, 59.25, 53.24, 53.31, 369/275.3, 94
See application file for complete search history.

(56) References Cited

U.S. PATENT DOCUMENTS

| | | | |
|---|---|---|---|
| 5,729,525 A | 3/1998 | Ishida et al. | |
| 5,930,225 A | 7/1999 | Ishida et al. | |
| 5,946,277 A * | 8/1999 | Kuroda et al. | 369/30.05 |
| 6,009,058 A * | 12/1999 | Sims et al. | 369/53.28 |
| 6,587,418 B1 | 7/2003 | Ozaki et al. | |
| 2003/0202782 A1 | 10/2003 | Motohashi et al. | |

FOREIGN PATENT DOCUMENTS

| | | | |
|---|---|---|---|
| JP | 60261078 A | * | 12/1985 |
| JP | 9-69264 | | 3/1997 |
| JP | 11-232792 | | 8/1999 |
| JP | 2000-306362 | | 11/2000 |
| JP | 2001-126255 | | 5/2001 |
| JP | 2001-236739 | | 8/2001 |
| JP | 2001-243712 | | 9/2001 |
| JP | 2002-15525 | | 1/2002 |
| JP | 2003-173626 | | 6/2003 |

* cited by examiner

*Primary Examiner*—Thang V. Tran
(74) *Attorney, Agent, or Firm*—Dickstein Shapiro Morin & Oshinsky LLP

(57) ABSTRACT

In an information recording device and method, user data are recorded in a recording medium having two or more recording layers and having a data area in which user data is recordable for each recording layer. A closing command is received after recording of user data in the data area of the recording medium is performed in response to a user-data write request. A minimum amount of lead-out data are written to the recording medium following an end position of the recorded user data in the data area of the recording medium, based on the received closing command.

18 Claims, 10 Drawing Sheets

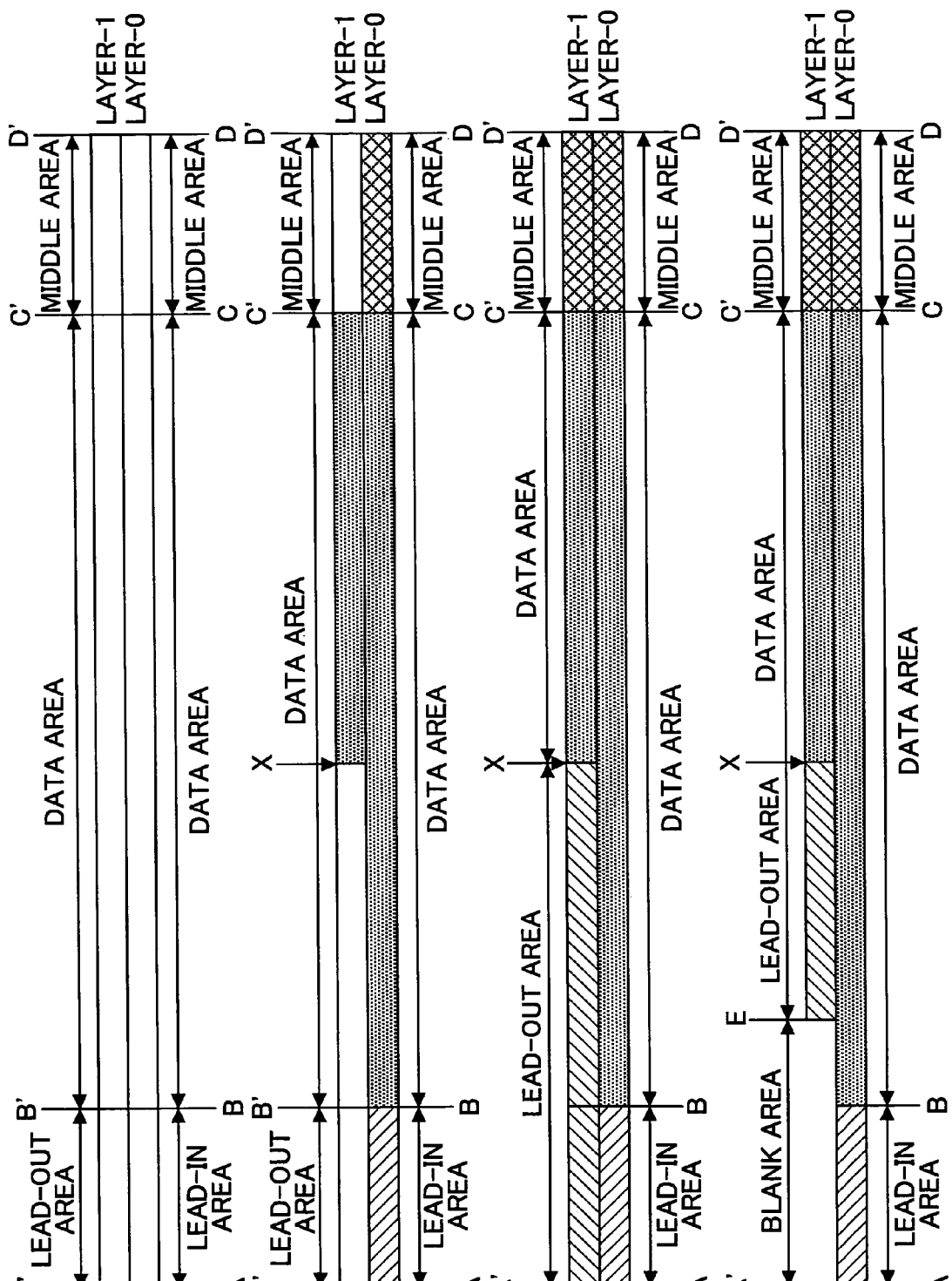

FIG.6

| BIT<br>BYTE | 7 | 6 | 5 | 4 | 3 | 2 | 1 | 0 |
|---|---|---|---|---|---|---|---|---|
| 0 | colspan="8" OPERATION CODE (5Bh) |||||||||
| 1 | RESERVED ||||||| IMMED. |
| 2 | RESERVED |||| CLOSE FUNCTION ||| |
| 3 | colspan="8" RESERVED |||||||||
| 4 | colspan="8" RESERVED |||||||||
| 5 | colspan="8" TRACK NUMBER |||||||||
| 6 | colspan="8" RESERVED |||||||||
| 7 | colspan="8" RESERVED |||||||||
| 8 | colspan="8" RESERVED |||||||||
| 9 | colspan="8" RESERVED |||||||||
| 10 | colspan="8" RESERVED |||||||||
| 11 | colspan="8" RESERVED |||||||||

FIG.7

| CLOSE FUNCTION | CLOSE ACTIONS |
|---|---|
| 011 | For CD media, this condition is reserved and not valid. The drive reports CHECK CONDITION Status, 5/24/00 INVALID FIELD IN CDB.<br>For DVD+RW media, if a background format is in progress, the format operation is stopped and the disk is structured for removal according to the DVD+RW 4.7 Gbytes Basic Formats Specifications for the specific purpose of providing DVD-RO compatibility. In general, this means that a [partial] lead-in is written, a [temporary] lead-out is appended and all unrecorded gaps between lead-in and lead-out are format written. The radius difference between the start of the temporary lead-out and the end of the temporary lead-out approximates 1 mm. If there is no background format is in progress, then no operation occurs and this is not considered an error.<br>For DVD+R media, this condition is reserved and not valid. The drive reports CHECK CONDITION Status, 5/24/00 INVALID FIELD IN CDB. |
| 100 | Reserved |
| 101 | For CD media, this condition is reserved and not valid. The drive reports CHECK CONDITION Status, 5/24/00 INVALID FIELD IN CDB.<br>For DVD+RW media, this condition is reserved and not valid. The drive reports CHECK CONDITION Status, 5/24/00 INVALID FIELD IN CDB.<br>For DVD+R media, close the last session and finalize the disk. Once this close function has been executed, no more writing to the disk is allowed. If not all tracks in the last session are closed, the drive terminates this command with CHECK CONDITION Status, 5/27/03 SESSION FIXATION ERROR-INCOMPLETE TRACK IN SESSION. In order to assure maximum interchange compatibility with read only devices, GuardZone 2 is recorded to at least PSN=7DDEDh. |
| 110 | For CD media, this condition is reserved and not valid. The drive reports CHECK CONDITION Status, 5/24/00 INVALID FIELD IN CDB.<br>For DVD+RW media, this condition is reserved and not valid. The drive reports CHECK CONDITION Status, 5/24/00 INVALID FIELD IN CDB.<br>For DVD+R media, close the last session and the disk. Once this close function has been executed, no more writing to the disk is allowed. If not all tracks in the last session are closed, the drive terminates this command with CHECK CONDITION Status, 5/27/03 SESSION FIXATION ERROR-INCOMPLETE TRACK IN SESSION. |
| 111 | Vendor Unique Code |

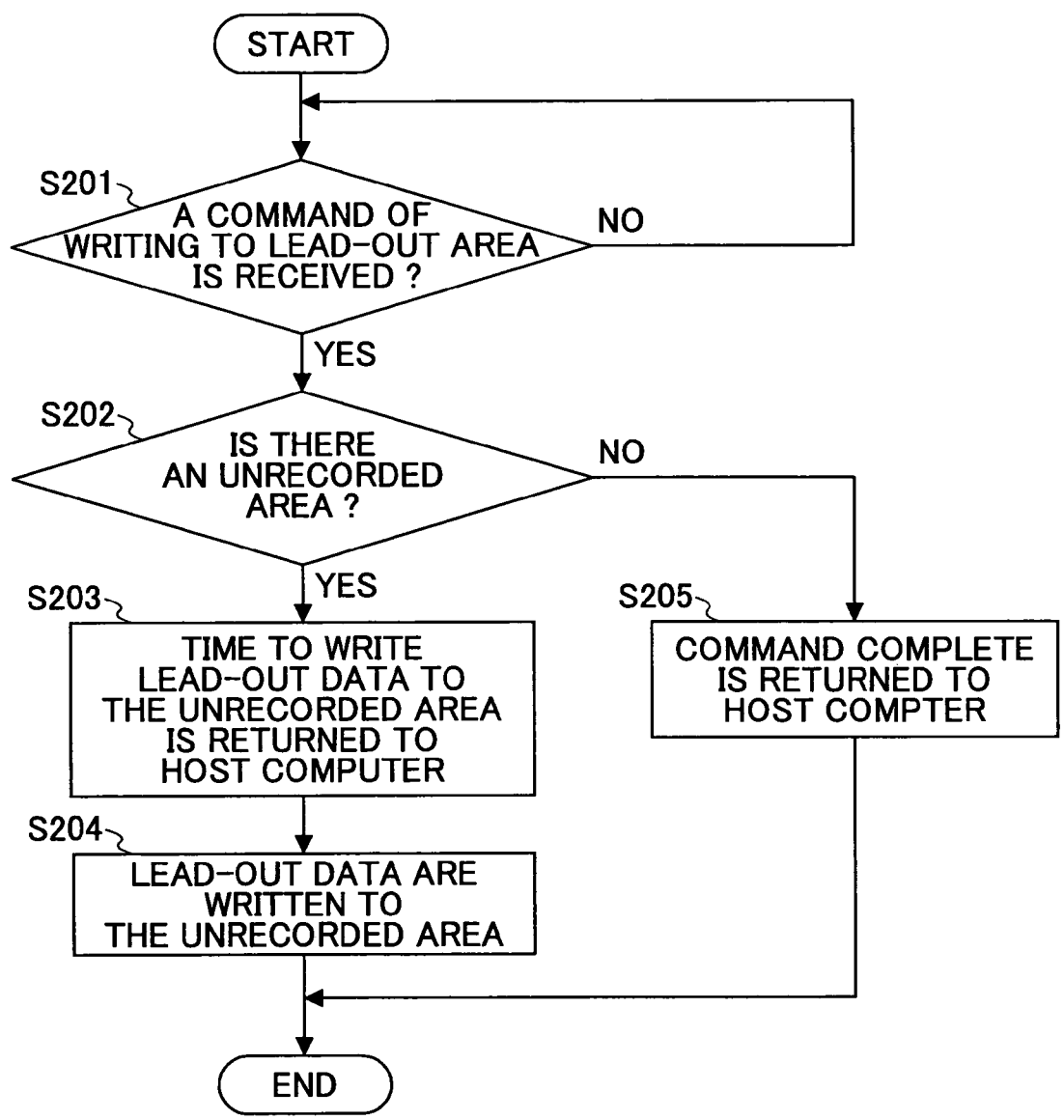

FIG.9A

COMMAND

| BYTE \ BIT | 7 | 6 | 5 | 4 | 3 | 2 | 1 | 0 |
|---|---|---|---|---|---|---|---|---|
| 0 | \multicolumn{8}{c|}{OPERATION CODE (CBh)} |
| 1 | \multicolumn{8}{c|}{RESERVED} |
| 2 | \multicolumn{8}{c|}{RESERVED} |
| 3 | \multicolumn{8}{c|}{RESERVED} |
| 4 | \multicolumn{8}{c|}{RESERVED} |
| 5 | \multicolumn{8}{c|}{RESERVED} |
| 6 | \multicolumn{8}{c|}{RESERVED} |
| 7 | \multicolumn{8}{c|}{RESERVED} |
| 8 | \multicolumn{8}{c|}{RESERVED} |
| 9 | \multicolumn{8}{c|}{RESERVED} |
| 10 | \multicolumn{8}{c|}{RESERVED} |
| 11 | \multicolumn{8}{c|}{RESERVED} |

FIG.9B

DATA FORMAT

| BYTE \ BIT | 7 | 6 | 5 | 4 | 3 | 2 | 1 | 0 |
|---|---|---|---|---|---|---|---|---|
| 0 | (MSB) | | | | | | | |
| 1 | | | | TIME | | | | |
| 2 | | | | | | | | |
| 3 | | | | | | | | (LSB) |

INFORMATION RECORDING DEVICE, INFORMATION RECORDING METHOD, INFORMATION RECORDING PROGRAM, AND RECORDING MEDIUM

CROSS-REFERENCE TO RELATED APPLICATIONS

This application is a U.S. continuation application filed under 35 USC 111(a) claiming benefit under 35 USC 120 and 365(c) of International Application No. PCT/JP2004/003916, filed on Mar. 23, 2004, which claims benefit of priority from Japanese patent application No. 2003-083360, filed on Mar. 25, 2003, and Japanese patent application No. 2003-357396, filed on Oct. 17, 2003. The entire contents of the foregoing three applications are hereby incorporated by reference.

BACKGROUND OF THE INVENTION

1. Field of the Invention

The present invention relates to an information recording device and method which records user data in a recording medium having two or more recording layers each of which has a data area capable of recording information, such as a dual-layer DVD–R. Moreover, the present invention relates to a computer program product embodied therein for causing the computer to execute the information recording method which records user data in the recording medium having two or more recording layers each of which has a data area capable of recording information.

2. Description of the Related Art

As the recordable DVDs, there are the DVD-R which is a write-once optical disk, and the DVD+RW which is a rewritable optical disk. These DVD disks have high reproduction compatibility with the read-only DVD disk which is provided with the single layer on the single side for the reproduction only. The research and development of the recordable DVDs have been performed briskly for the high-speed access and the large storage capacity of the media.

Among them, there is the single-side dual-layer DVD+R disk (called the dual-layer DVD+R) which has high reproduction compatibility with the read-only DVD disk of the single-side dual-layer type which is provided for reproduction only. The storage capacity of the dual-layer DVD+R is 8.4 Gbytes, which is about twice the storage capacity of the conventional single-layer DVD+R which is 4.7 Gbytes. The recorded data in the dual-layer DVD-R can be read out by the DVD-ROM drive or the DVD player which is capable of reading the read-only DVD disk of the single-side dual-layer type. For example, the information recording device which records information in the recordable DVD is known from Japanese Laid-Open Patent Application No. 2001-126255.

There are the two addressing methods for the single-side dual-layer DVD disks: the Parallel Track Path method (called the PTP method) and the Opposite Track Path method (called the OTP method). In the PTP method, both the addresses of the track on the first layer and the addresses of the track on the second layer increase from the inner periphery to the outer periphery in a parallel manner. In the OTP method, the addresses of the track on the first layer increase from the inner periphery to the outer periphery while the addresses of the track on the second layer increase from the outer periphery to the inner periphery.

According to the PTP method, the starting position in the radial direction of the disk where the data area starts is the same for both the first layer and the second layer, and the physical sector number of the starting position is 30000h for both the first and second layers. Moreover, after the end of the data area, the lead-out area is arranged in the disk.

According to the OTP method, the starting position in the radial direction of the disk where the data area of the second layer starts is the same as the end position in the radial direction of the disk where the data area of the first layer ends. The physical sector number of the starting position of the data area of the second layer is equal to the bit-inverted address of the physical sector number of the end position of the data area of the first layer. When the data area of the first layer and the data area of the second layer are different in size, the difference region is included in the lead-out area of the disk.

For example, when the end address D1 of the data area of the first layer and the end address D2 of the data area of the second layer in the PTP disk are set to meet the condition D1>D2, the difference region D1−D2 is included in the lead-out area of the disk. Thus, when the user data are recorded in some region of one of the two recording layers, the user data are also recorded in the corresponding region of the other recording layer.

The purpose of such data recording is to avoid the problem that the data of the first layer cannot be read by the optical head when reproducing the data of the first layer. When the focused laser beam is directed to the second layer by chance during the seeking of the target address, the address information cannot be acquired from the second layer if the user data are not written to the second layer at the same radial position as the first layer of the disk. Consequently, the difficulty of the reproduction of the data of the first layer may arise. To avoid this problem, performing the above data recording is necessary.

Moreover, the logical address in the dual-layer DVD is continuously assigned from the starting address of the data area of the first layer. The logical address of the starting position of the data area of the second layer continuously follows the logical address of the end position of the data area of the first layer.

That is, when performing reproduction of the dual-layer DVD, the user specifies the target reproduction region of the dual-layer DVD using the logical address, so that the reproduction is allowed without being conscious of whether the reproduction region is located on the first layer or the second layer.

On the other hand, when performing recording of user data in the dual-layer DVD+R, the user specifies the target recording region of the dual-layer DVD+R using the logical address similar to the reproduction processing.

For this reason, when the user performs the data recording continuously, the recording is started from the starting address of the data area of the first layer. When the recording up to the end address of the data area of the first layer is completed, the recording will be continuously started from the starting address of the data area of the second layer.

Thus, the user can carry out the data recording of the dual-layer DVD+R without being conscious of whether the recording region is located on the first layer or the second layer.

However, there may be a case in which recording of user data is completed in the middle of the data area of the second layer. Or there may be a case in which recording of user data is completed in the middle of the data area of the first layer without recording any of the user data in the second layer at all.

If recording of user data is completed in the middle of the data area of the second layer, the non-recorded region is left in the data area of the second layer, which will cause the dual-layer DVD+R disk to lose reproduction compatibility with the read-only type DVD because of the non-recorded region left in the data area of the second layer.

Moreover, if the focused laser beam is directed to the second layer by chance during the seeking of the target address when reproducing the user data from the first layer, the address information cannot be acquired from the second layer. This is because the non-recorded region is left in the data area of the second layer, and the data are not written to the second layer at the same radial position as the first layer. In such a case, the problem that the user data of the first layer cannot be read arise. The same problem may arise when the recording of the user data is completed in the middle of the data area of the first layer without recording any of the user data in the second layer.

SUMMARY OF THE INVENTION

An object of the present invention is to provide an improved information recording device and method in which the above-described problems are eliminated.

Another object of the present invention is to provide an information recording device and method which can maintain reproduction compatibility with a predetermined read-only type optical recording medium by avoiding having a non-recorded region left in the data areas of a dual-layer optical disk after recording of user data in the dual-layer optical disk is completed in the middle of the data area of one recording layer.

Another object of the present invention is to provide a computer program product embodied therein for causing a computer to execute an information processing method which can maintain reproduction compatibility with a predetermined read-only type optical recording medium by avoiding having a non-recorded region left in the data areas of a dual-layer optical disk after recording of user data in the dual-layer optical disk is completed in the middle of the data area of one recording layer.

The above-mentioned objects of the present invention are achieved by an information recording device which records user data in a recording medium having two or more recording layers and having a data area in which user data is recordable for each recording layer, the information recording device comprising: a receiving unit receiving a closing command after recording of user data in the data areas of the recording medium is performed in response to a user-data write request; and a writing unit writing a minimum amount of lead-out data to the recording medium following an end position of the recorded user data in the data areas of the recording medium, based on the received closing command.

The above-mentioned objects of the present invention are achieved by an information recording method information recording method which records user data in a recording medium having two or more recording layers and having a data area in which user data is recordable for each recording layer, comprising the steps of: receiving a closing command after recording of user data in the data areas of the recording medium is performed in response to a user-data write request; and writing a minimum amount of lead-out data to the recording medium following an end position of the recorded user data in the data areas of the recording medium, based on the received closing command.

The above-mentioned objects of the present invention are achieved by a computer program product embodied therein for causing a computer of an information recording device to execute an information recording method which records user data in a recording medium having two or more recording layers and having a data area in which user data is recordable for each recording layer, the method comprising the steps of: receiving a closing command after recording of user data in the data areas of the recording medium is performed in response to a user-data write request; and writing a minimum amount of lead-out data to the recording medium following an end position of the recorded user data in the data areas of the recording medium, based on the received closing command.

The above-mentioned objects of the present invention are achieved by a computer-readable recording medium storing a program embodied therein for causing a computer to execute an information recording method which records user data in an optical recording medium having two or more recording layers and having a data area in which user data is recordable for each recording layer, the information recording method comprising the steps of: receiving a closing command after recording of user data in the data areas of the optical recording medium is performed in response to a user-data write request; and writing a minimum amount of lead-out data to the optical recording medium following an end position of the recorded user data in the data areas of the optical recording medium, based on the received closing command.

According to the present invention, the lead-out data are written to the dual-layer optical disk following the end position of the recorded user data in the data areas thereof even when recording of the user data in the dual-layer optical disk is completed in the middle of the data area of one recording layer. Therefore, it is possible to maintain reproduction compatibility with a predetermined read-only type optical disk having two or more recording layers.

Moreover, the minimum amount of lead-out data are recorded in the duel-layer optical disk, and it is not necessary to write the lead-out data to all the non-recorded regions. Therefore, the time needed to complete the user data recording and the removal of the optical disk can be shortened.

BRIEF DESCRIPTION OF THE DRAWINGS

Other objects, features and advantages of the present invention will be apparent from the following detailed description when reading in conjunction with the accompanying drawings.

FIG. 4A, FIG. 4B, FIG. 4C and FIG. 4D are diagrams for explaining the processing of the information recording method of the present embodiment applied to the dual-layer DVD+R according to the OTP method.

FIG. 6 is a diagram for explaining the closing command Close Track/Session Command (CDB:5B) which is outputted to the optical disk drive by the host computer.

FIG. 7 is a diagram for explaining the closing function table of the closing command Close Track/Session Command (CDB:5B).

FIG. 8 is a flowchart for explaining another processing of the method of recording lead-out data when recording of the user data is completed in the middle of the layer 1.

FIG. 9A and FIG. 9B are diagrams for explaining the command of recording the lead-out data to the non-recorded region in the data area which is outputted to the optical disk drive by the host computer, and the data format.

DETAILED DESCRIPTION OF PREFERRED EMBODIMENTS

A description will now be given of the preferred embodiments of the invention with reference to the accompanying drawings.

Figure 1:
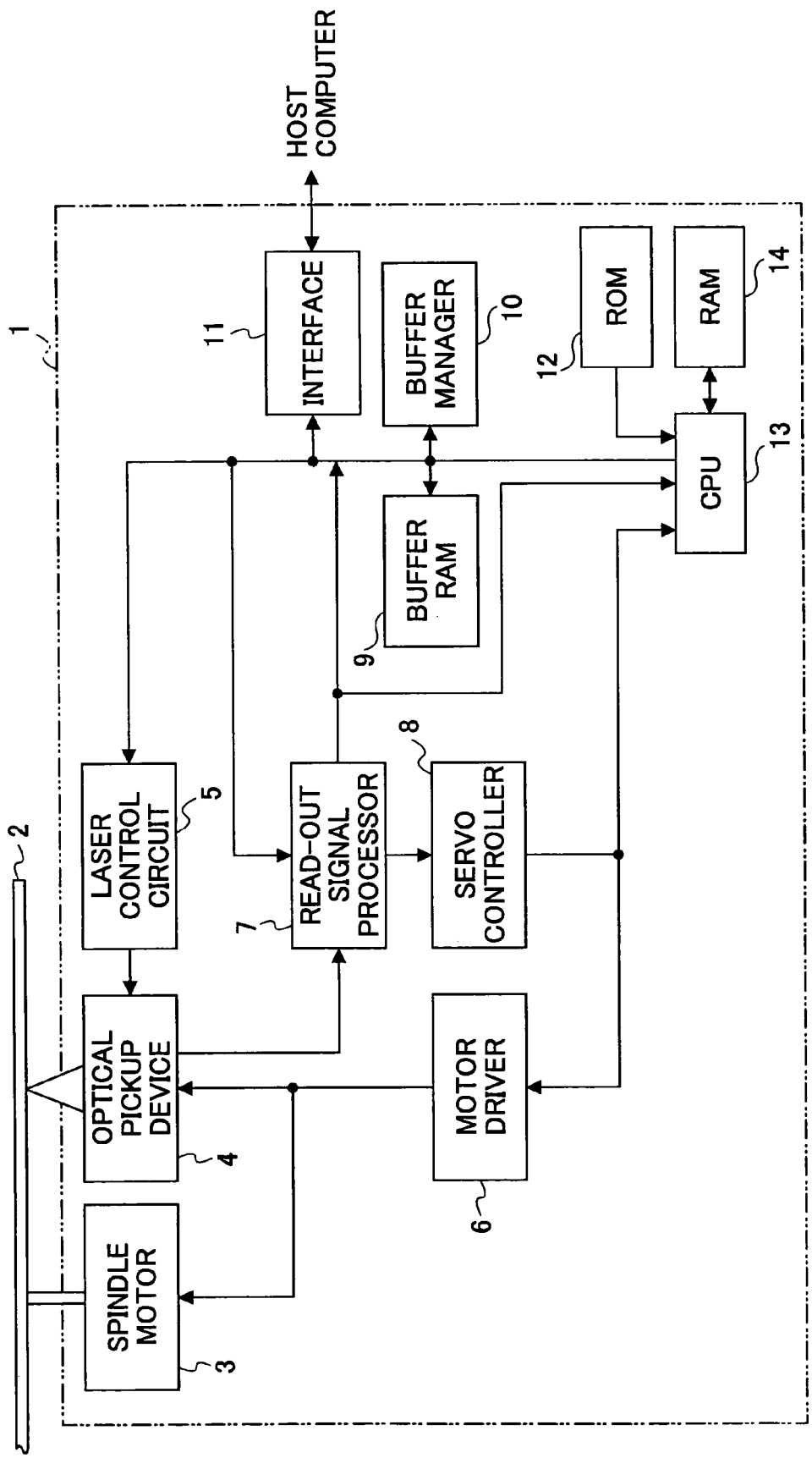
FIG. 1 is a block diagram showing the composition of an optical disk drive in which the information recording device of the present invention is embodied.

FIG. 1 shows the composition of an optical disk drive in which the information recording device of the invention is embodied.

The optical disk drive 1 comprises the spindle motor 3 for performing the rotation drive of the optical disk 2 as an information recording medium, the optical pickup device 4, the laser control circuit 5, the motor driver 6, the read-out signal processing circuit 7, the servo controller 8, the buffer RAM 9, the buffer manager 10, the interface 11, the ROM 12, the CPU 13, the RAM 14, etc. In addition, the arrows in FIG. 1 indicate the typical signal or information flows in the optical disk drive 1 only, but do not indicate all the connections between the relevant blocks of the optical disk drive 1.

For the sake of the description of the present invention, it is supposed that the optical disk 2 is the dual-layer DVD+R which is in conformity with the DVD+R standards.

The optical pickup device 4 is comprised of the optical system containing the objective lens which is reflected by the recording surface and to which it returns and light is led to the predetermined light-receiving position, the photodetector which is arranged in the light-receiving position, returns and receives light, the drive mechanism (including the focusing actuator, the tracking actuator, the seeking motor, etc. which are not illustrated), while leading the semiconductor laser as the light source, and the laser beam which are outputs from this semiconductor laser to the recording surface of the optical disk 2.

From the photodetector, the current (current signal) according to the amount of light received is outputted to the read-out signal processing circuit 7.

The servo controller 8 creates the control signal which controls the focusing actuator of the optical pickup device 4 based on the focusing error signal, and creates also the control signal which controls the tracking actuator of the optical pickup device 4 based on the tracking error signal. These control signals are outputted to the motor driver 6 from the servo controller 8.

In the motor driver 6, the focusing actuator and the tracking actuator of the optical pickup device 4 are driven based on the control signals from the servo controller 8.

Moreover, the spindle motor 3 is controlled by the motor driver 6 based on the command of CPU 13, so that the linear velocity of the optical disk 2 is fixed.

Furthermore, the seeking motor for the optical pickup device 4 is driven by the motor driver 6 based on the command of CPU 13, so that the optical pickup device 4 is moved in the radial direction of the optical disk 2 and turned to the target track of the optical disk 2.

The interface 11 is the bi-directional communication interface between the optical disk drive 1 and the host computer as the external device.

The CPU 13 constitutes the microcomputer of the optical disk drive 1 together with the ROM 12 and the RAM 14.

The program including the information recording program of the invention which is described in instruction codes decipherable by the CPU 13 is stored in the ROM 12, and this ROM 12 functions as a computer-readable storage medium.

The CPU 13 controls operation of the above-mentioned elements of the optical disk drive 1 according to the program stored in the ROM 12 and stores the data needed for such control temporarily in the RAM 14.

Upon power up of the optical disk drive 1, the program stored in the ROM 12 is loaded into the main memory (not shown) of the CPU 13 and execution of the program is carried out.

The information recording device of the present embodiment is characterized in controlling of information recording processing when the dual-layer DVD+R (the optical disk 2) is mounted on the optical disk drive 1 and a command of user-data write request is received from the host computer.

Before describing the preferred embodiments of the present invention, a description will be given of the layouts of the read-only type DVD disks which are the requisite for the specifications of the DVD+R standards.

Figure 2A:
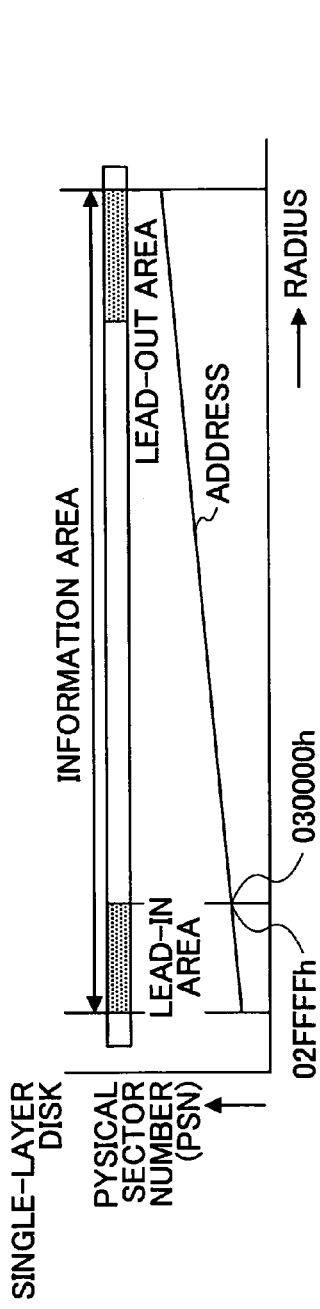
FIG. 2A, FIG. 2B and FIG. 2C are diagrams showing examples of the layouts of some read-only DVD disks.
Figure 2B:
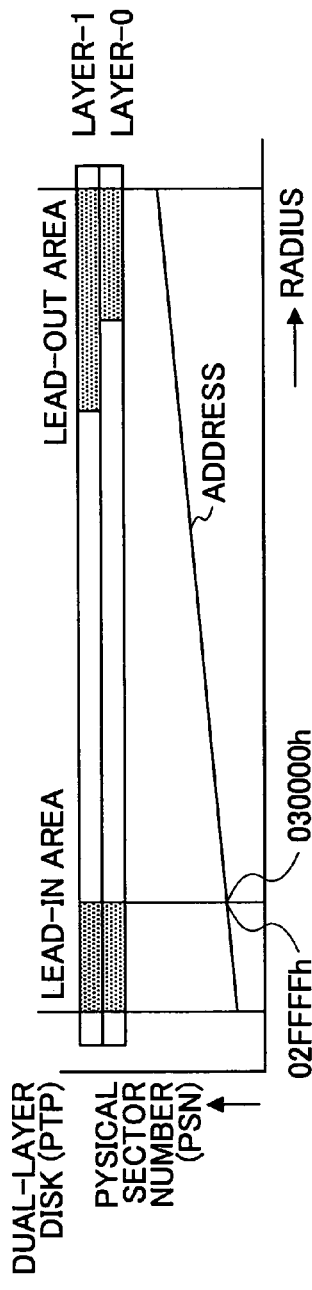
Figure 2C:
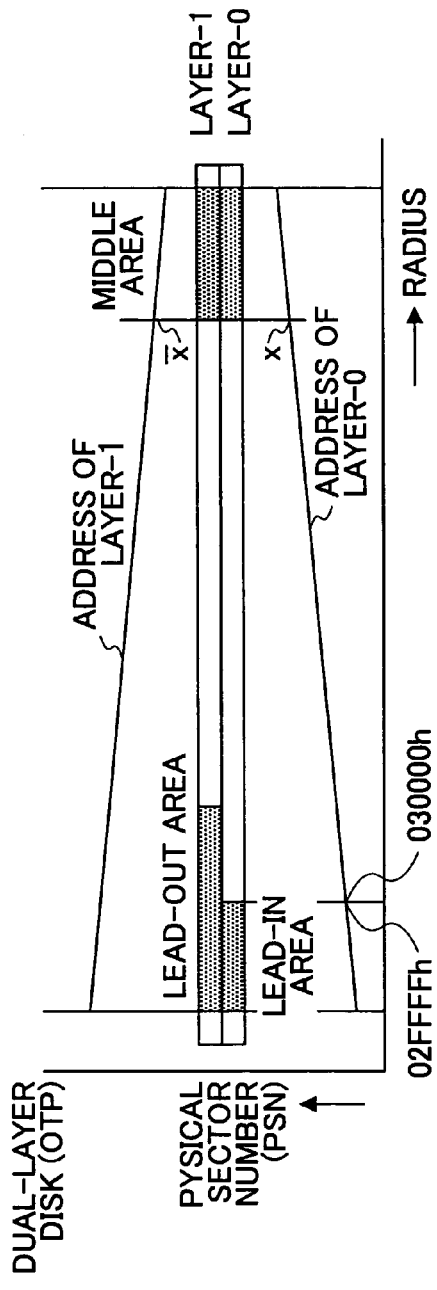

FIG. 2A shows the layout of the single-side, single-layer disk (called the single-layer disk), FIG. 2B shows the layout of the single-side, dual-layer disk (called the PTP disk) according to the PTP method, and FIG. 2C shows the layout of the single-side, dual-layer disk (called the OTP disk) according to the OTP method.

The DVD disks generally have the information area which includes the lead-in area, the data area, and the lead-out area, and, in the case of the single-layer disk and the PTP disk, they have the information area for every recording layer.

The OTP disk includes a single information area, and has the middle area preceding or following the data area for each recording layer.

Reproduction of data is performed from the inner periphery to the outer periphery of the disk for the layers 0 and 1 of the single-layer disk and the PTP disk and for the layer 0 of the OTP disk. Reproduction of data is performed from the outer periphery to the inner periphery of the disk for the layer 1 of the OTP disk.

The physical sector number (PSN) is assigned for each recording layer of the single-layer disk and the PTP disk continuously from the lead-in area to the lead-out area.

On the other hand, in the case of the OTP disk, the physical sector number is assigned continuously from the lead-in area to the middle area of the layer 0, and the bit-inverted physical sector number of the layer 0 is assigned as the physical sector number of the layer 1. The physical sector number of the layer 1 increases from the middle area to the lead-out area.

In other words, the starting address of the data area in the layer 1 is the same as the bit-inverted address which is derived from the ending address of the data area in the layer 0.

As shown in FIG. 2B, in the case of the PTP disk, the starting address and ending address of the lead-in area, the starting address of the data area, and the ending address of the lead-out area are at the same radial position with respect to the layer 0 and the layer 1, but the starting addresses of the lead-out areas (i.e., the ending addresses of the data areas) of the layer 0 and the layer 1 may differ. When the ending addresses of the data areas differ, the lead-out data is recorded in the difference region.

On the other hand, as shown in FIG. 2C, in the case of the OTP disk, the starting address of the lead-in area and the ending address of the lead-out area, the ending address of the data area of the layer 0 and the starting address of the data area of the layer 1, and the middle area of each recording layer are at the same radial position, but the data area starting address of the layer 0 and the data area ending address of the layer 1 are not necessarily in agreement. Also in the case of the OTP disk, the lead-out data are written to the difference region.

Next, the information recording method of the present embodiment which is applied to the dual-layer DVD+R (optical disk 2) of the PTP method to be in conformity with the layouts of the read-only DVD disks will be explained with reference to FIG. 3A through FIG. 3D.

Figure 3A:
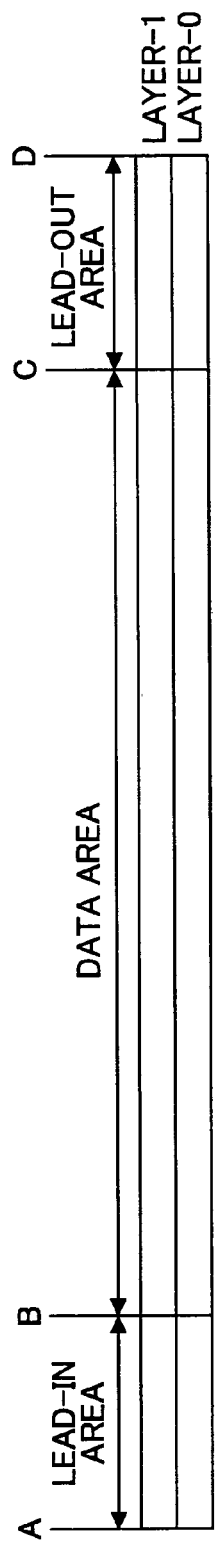
FIG. 3A, FIG. 3B, FIG. 3C and FIG. 3D are diagrams for explaining the processing of the information recording method of the present embodiment applied to the dual-layer DVD+R according to the PTP method.

FIG. 3A shows the layout of dual-layer DVD+R in the state which is not recorded at all where it does not record.

The lead-in area, the data area (data area), and the lead-out area exist in each recording layer of the layer 1 which is the layer 0 and the second recording layer which are the first recording layer respectively.

In FIG. 3A, the starting address of the data area and C show the starting address of the lead-out area, as for A, D shows the position of the ending address of the lead-out area, as for the lead-in groove starting address and B, and address A-D in each recording layer (layers 0 and 1) is located in the same radial position of the optical disk 2.

Figure 3B:
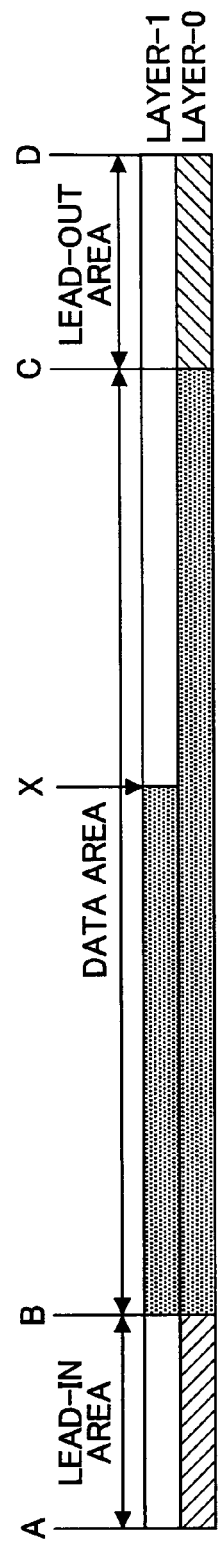

FIG. 3B shows the layout of dual-layer DVD+R when recording of the user data is completed in the middle of the layer 1.

Figure 3C:
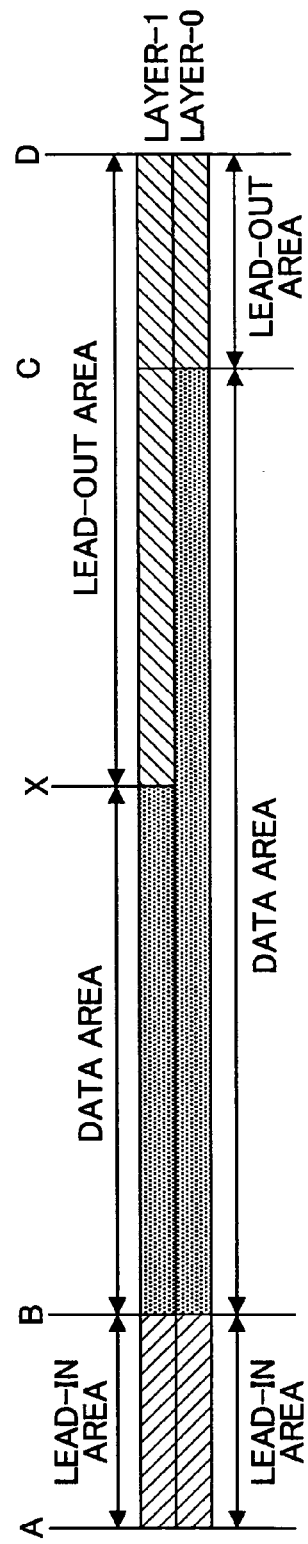
Figure 3D:
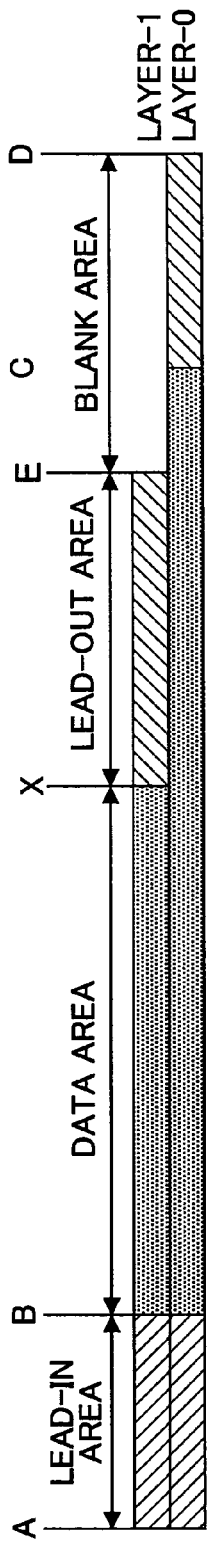

Moreover, FIG. 3C and FIG. 3D are diagrams for explaining the information recording method of the present embodiment in case recording of the user data is completed in the middle of the layer 1.

It is shown that recording of the user data completed FIG. 3B in the position of the address X of the second (layer 1) layer. Thus, when recording of the user data is completed in the middle of one recording layer; as shown in FIG. 3C, it is good to use the information recording method including the procedure which records lead-out data on the non-recorded region after the recording region of the user data.

That is, lead-out data are recorded as a non-recorded region predetermined in the region from the address X of the layer 1 to address D. Therefore, in the recording layer of the layer 1, address B to the lead-in area and X serve as B the data area and address X to D the lead-out area from address A to C being D the lead-out area from the data area and address C from the lead-in area and address B from address A in the recording layer of the layer 0 for B.

Consequently, when it becomes the same disk layout as DVD-ROM only for of the dual-layers of one side reproduction and recording of the user data is completed in the middle of the data area of the second (layer 1) layer, it is possible to maintain reproduction compatibility with the read-only type DVD-ROM of the single-side, dual-layer configuration.

In the information recording method of the present embodiment, when recording of the user data is completed in the middle of one recording layer, as shown in FIG. 3D, the minimum lead-out data are written to the non-recorded region after the recording region of the user data.

This minimum lead-out data is the lead-out data according to the tempo rally lead-out groove specified to the specification of DVD+RW, and should just be data which include 64ECC Block.

In the example of FIG. 3D, the region from the address X of the layer 1 to address D is the predetermined non-recorded region, and the minimum lead-out data are written to the region from address X to address E among the regions from this address X to address D.

Therefore, in the recording layer of the layer 1, address B to the lead-in area and X serve as B the data area and address X to E the lead-out area from address A to C being D the lead-out area from the data area and address C from the lead-in area and address B from address A in the recording layer of the layer 0 for B.

Next, the information recording method of the present embodiment to dual-layer DVD+R (optical disk 2) of the OTP method based on the layout of the DVD disk only for reproduction is explained with reference to FIG. 4A through FIG. 4D.

FIG. 4A shows the layout of dual-layer DVD+R in the state which is not recorded at all where it does not record.

The lead-in area, the data area, and the middle area exist in the layer 0 which is the first recording layer from the circumference in the disk, and the middle area, the data area, and the lead-out area exist in the layer 1 which is the second recording layer from the disk perimeter.

For A, in FIG. 4A, the starting address of the lead-in area and B are the starting address of the middle area of the layer 0 and D of the starting address of the data area of the layer 0 and C the ending addresses of the middle area of the layer 0.

Moreover, in FIG. 4A, in the starting address of the data area of the layer 1, and B', the starting address of the lead-out area and A' show D' the starting address of the middle area of the layer 1, and C' the position of the ending address of the lead-out area, and A, A', B and B', C and C', and D and D' are the values which carried out bit flipping respectively, and are located in the same radial position of the optical disk 2.

FIG. 4B shows the layout of dual-layer DVD+R when recording of the user data is completed in the middle of the layer 1.

FIG. 4C and FIG. 4D are diagrams for explaining the information recording method of the present embodiment when recording of the user data is completed in the middle of the layer 1. It is shown that recording of the user data ended FIG. 4B in the position of the address X of the second (layer 1) layer.

Thus, when recording of the user data is completed on the way, as shown in FIG. 4C, it is good to use the information recording method including the procedure which records lead-out data on the non-recorded region after the recording region of the user data.

That is, lead-out data are recorded considering the region from address X to address A' as a predetermined non-recorded region. Therefore, address A to B the middle area of the layer 1 and from address C' to X serve as the lead-in area and from the address B to C the data area of the layer 0, and from the address C to D the middle area of the layer 0, and from address D' to C' the data area of the layer 1, and from the address X to A' the lead-out area.

Consequently, when it becomes the same disk layout as the read-only type DVD-ROM of the single-side, dual-layer configuration and recording of the user data is completed in the middle of the data area of the second (layer 1) layer, it is possible to maintain reproduction compatibility with the read-only type DVD-ROM of the single-side, dual-layer configuration.

In the information recording method of the present embodiment, when recording of the user data is completed in the middle of one recording layer, as shown in FIG. 4D, the minimum lead-out data are written to the non-recorded region after the recording region of the user data.

This minimum lead-out data is the lead-out data according to the tempo rally lead-out groove specified to the specification of DVD+RW, and should just be data which include 64ECC Block.

In the example of FIG. 4D, lead-out data are recorded considering the region from address X to address E as a predetermined non-recorded region. Therefore, address A to B the middle area of the layer 1 and from address C' to X serve as the lead-in area and from the address B to C the data area of the layer 0, and from the address C to D the middle area of the layer 0, and from address D' to C' the data area of the layer 1, and from the address X to E the lead-out area.

Next, the processing of the information recording method of the present embodiment when recording of the user data is completed in the middle of the layer 1 as shown in FIG. 3C, FIG. 3D, FIG. 4C and FIG. 4D will be explained with reference to FIG. 5 through FIG. 12.

The CPU 13 of the optical disk drive 1 in this information recording mode is beforehand stored in ROM 12, and it performs according to the program are loaded to the power up of the optical disk drive 1 concerned by whose main memory (not shown) of CPU 13 (installation).

Figure 5:
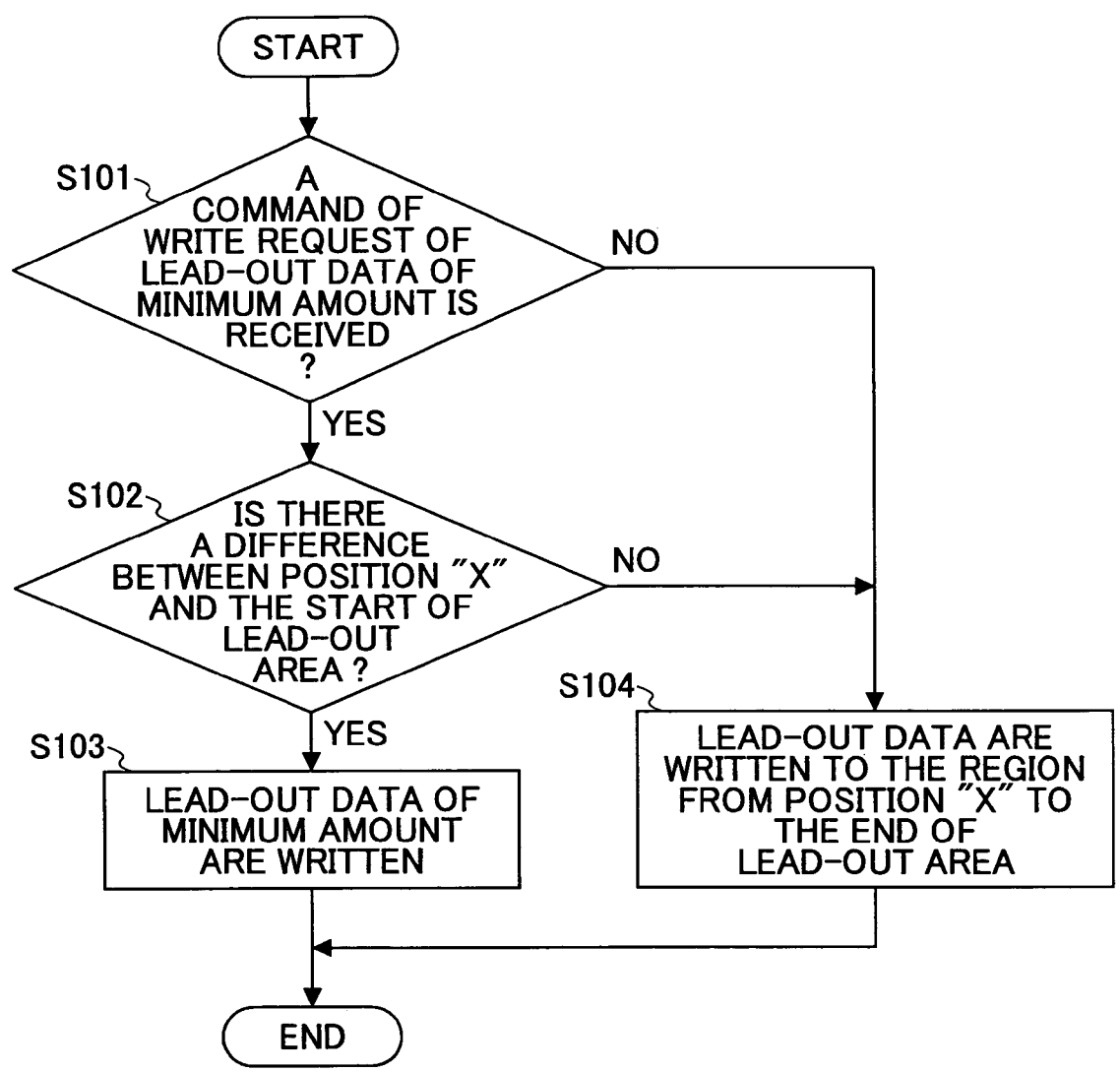
FIG. 5 is a flowchart for explaining the processing of the method of recording lead-out data when recording of the user data is completed in the middle of the layer 1.

FIG. 5 is a flowchart for explaining the processing of the method of recording lead-out data, when recording of the user data is completed in the middle of the layer 1. FIG. 6 is a diagram for explaining closing command Close Track/Session Command (CDB:5B) which the host computer outputs to the optical disk drive 1. FIG. 7 is a diagram for explaining the closing function table of closing command Close Track/Session Command (CDB:5B).

After recording of the user data is completed, in order to maintain compatibility with DVD-ROM, the host computer outputs closing command Close Track/Session Command (CDB:5B) as shown in FIG. 6 to the optical disk drive 1.

When this command is outputted, the optical disk drive 1 of the present embodiment is. The closing function table of closing command Close Track/Session Command (CDB: 5B) shown in FIG. 7 is referred to.

The received closing command Close Track/Session Command (CDB:5B) is analyzed. In step S101, it is determined whether the closing function included in this closing command Close Track/Session Command (CDB:5B) is the Close Function "111" which indicates the command of the minimum lead-out data write request.

When it is determined in step S101 that the received closing command contains Close Function "111" which indicates the command of the minimum lead-out data write request, it judges by address comparison whether there is any difference in the address position (X position of FIG. 3B, X position of FIG. 4B) of the user data record end and the starting address of the lead-out area (step 102).

When it is determined in step S102 that there is the difference, the minimum lead-out data which include 64ECC Block are recorded after the record ending address of the user data in the data area (step S103).

Removal of the optical disk 2 is performed after the end of step S103.

On the other hand, when it is determined in step S101 that Close Function "b 111" which indicates the minimum lead-out data write request command is not included in the closing command Close Track/Session Command received from the host computer, the lead-out data are written to all the regions from the record ending address of the user data in the data area to the ending address of the lead-out area (step S104).

Removal of the optical disk 2 is performed after the end of step S104.

Moreover, when it is determined that the closing command Close Track/Session Command received from the host computer contains Close Function "111" which indicates the minimum lead-out data write request command and that there is no difference between the record ending address of the user data and the starting address of the lead-out area in the data area, the lead-out data are written to all the regions from the record ending address of the user data in the data area to the ending address of the lead-out area (step S104).

Removal of the optical disk 2 is performed after completion of step S104.

Therefore, when recording of the user data is completed in the middle of the data area of one recording layer, compatibility with the read-only recording medium which has two or more recording layers (the layer 0, the layer 1) can be maintained since the lead-out data are recorded following the user data.

Moreover, when it is determined in step S101 that Close Function "111" which indicates the minimum lead-out data write request command is included in the closing command Close Track/Session Command received from the host computer, the lead-out data in the minimum amount are recorded. Thereby, it is not necessary to record the lead-out data over all the non-recorded regions in the data area, the time needed to perform the removal of the optical disk 2 following the recording of the user data can be shortened.

FIG. 8 is a flowchart for explaining another processing of the method of recording the lead-out data when recording of the user data is completed in the middle of the layer 1.

FIG. 9A and FIG. 9B are diagrams for explaining the command (vendor unique command CDB:CB) of recording the lead-out data to the non-recorded region of the data area which is outputted to the optical disk drive 1 by the host computer, and the data format.

The CPU 13 of the optical disk drive 1 judges by RF check whether the non-recorded region exists in the data area of the optical disk 2 inserted, when the command (vendor unique command CDB:CB) which indicates the non-recorded region in the data area to FIG. 9A which is the record request command recorded by lead-out data, and FIG. 9B from the host computer is received (Y of step S201) (step S202).

Consequently, if the non-recorded region does not exist in the data area so that it may illustrate to FIG. 3C or FIG. 4C, it is judged with the non-recorded region not existing in the data area in step S202.

The optical disk drive 1 returns Command Complete to the command (vendor unique command CDB:CB) which records the non-recorded region transmitted from the host computer by lead-out data (step S205).

On the other hand, as a result of checking by RF check in step S202, when it is judged with the non-recorded region existing in the data area, the record time taken to refer to the starting address of the non-recorded region and the ending address of the lead-out area recording lead-out data on all non-recorded regions is computed, and the record time of the computed non-recorded region is transmitted to the host computer (step S203).

In this case, if the non-recorded region does not exist in the data area in the optical disk 2 which is the DVD disk of the dual-layers of one side inserted in the optical disk drive 1, the record time is set up with "0" and data are transmitted to the host computer (step S203).

After transmitting data to the host computer, the non-recorded region in the data area is recorded by lead-out data (step S204). Thus, it is since all non-recorded regions are recorded by lead-out data among the data areas which record the user data when the command (vendor unique command CDB:CB) which records all non-recorded regions by lead-out data from the host computer is received at step S201 according to the present embodiment.

For example, when the user reproduces the data of the first recording layer (layer 0), it reads to the second recording layer (layer 1) by the seek to the purpose address and the focus of laser suits, the problem that the data of the first recording layer (layer 0) are not reproduced can be avoided by not recording data on the second recording layer (layer 1) of the same radial position.

Figure 10:
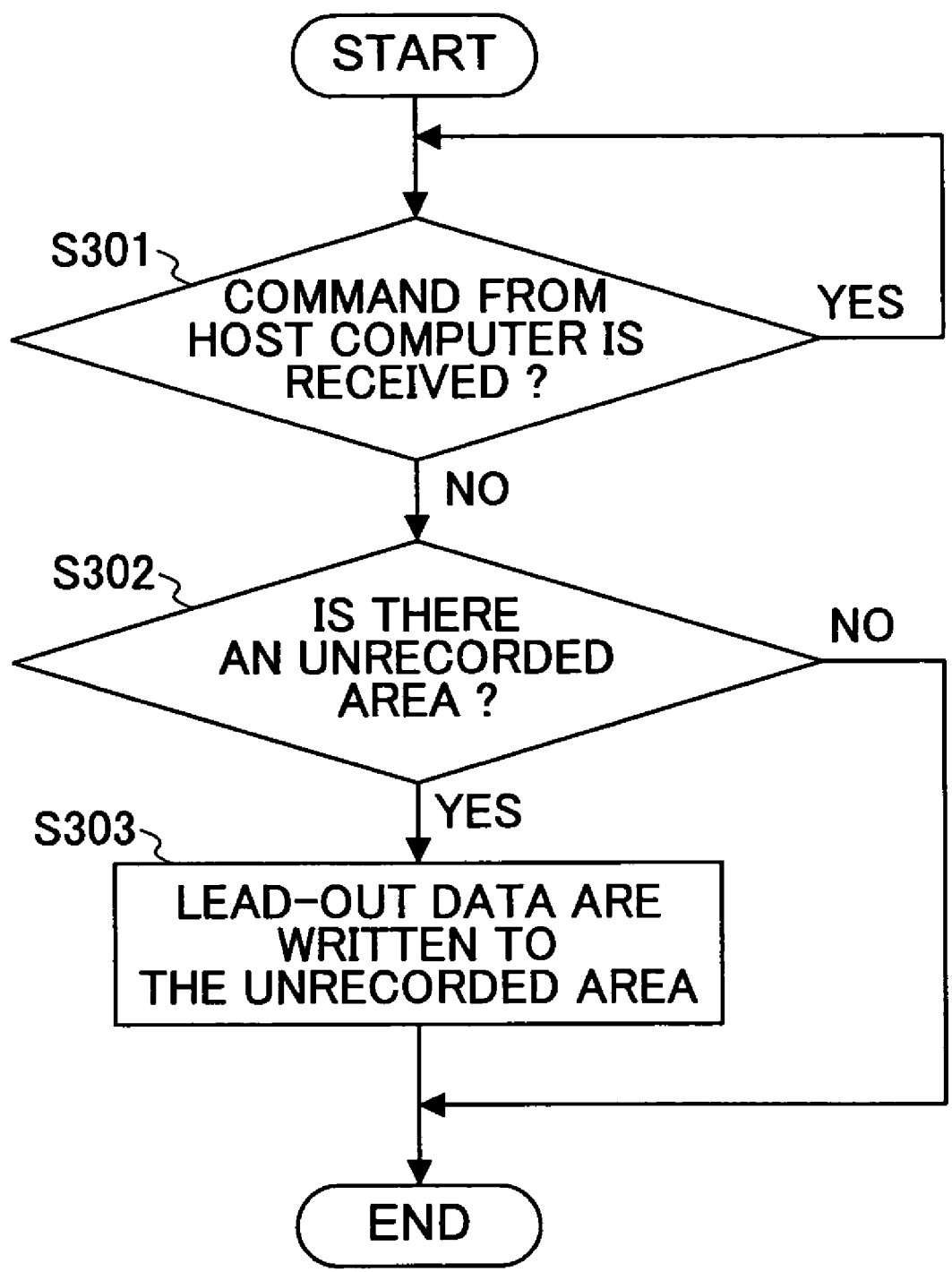
FIG. 10 is a flowchart for explaining processing of the method of recording lead-out data when no data-accessing command is received from the host computer.

FIG. 10 is a flowchart for explaining processing when no data-accessing command is received from the host computer.

In step S301, the optical disk drive 1 checks with the check of RF whether the non-recorded region exists to the optical disk 2 which is the DVD disk of the dual-layers of one side inserted, when there is no data-accessing command from the host computer (step S302).

Consequently, if the non-recorded region exists in the data area as shown in FIG. 3D or FIG. 4D, it will be judged with the non-recorded region existing in the data area in step S302.

In this case, the optical disk drive 1 records lead-out data to the non-recorded region in the data area at the time of the background format to which the data-accessing command from the host computer is not outputted (step S303).

On the other hand, if the non-recorded region does not exist in the data area as shown in FIG. 3C or FIG. 4C, it is judged with the non-recorded region not existing in the data area in step S302.

In this case, it shifts to the state of the waiting for standby of the command from the host computer.

Therefore, according to the present embodiment, the lead-out data are written to the non-recorded region in the data area in the optical disk 2 at the time of the background format to which the data-accessing command from the host computer is not outputted.

When the user reproduces the data of the first recording layer (layer 0) when it reads to the second recording layer (layer 1) by chance by the seek to the purpose address and the focus of laser suits, the problem that the data of the first recording layer (layer 0) are not reproduced can be avoided by not recording data on the second recording layer (layer 1) of the same radial position.

And since recording of such lead-out data is performed at the time of the background format to which the data-accessing command from the host computer is not outputted, un-arranging the time for taking out the optical disk 2 after data recording becomes long does not arise.

The present invention is not limited to the above-described embodiments, and variations and modifications may be made without departing from the scope of the present invention.

What is claimed is:

1. An information recording device which records user data in a recording medium having two or more recording layers and having a data area in which user data is recordable for each recording layer, comprising:
   a receiving unit receiving a closing command after recording of user data in the data areas of the recording medium is performed in response to a user-data write request; and
   a writing unit writing a minimum amount of lead-out data to the recording medium following an end position of the recorded user data in the data areas of the recording medium, based on the received closing command, wherein the writing unit is provided to write the minimum amount of lead-out data to the recording medium when the received closing command contains a close function indicating a command of minimum-amount lead-out data write request.

2. The information recording device according to claim 1 wherein the writing unit is provided to write lead-out data to all non-recorded regions of the recording medium following the end position of the recorded user data in the data areas when the received closing command does not contain a close function indicating a command of minimum-amount lead-out data write request.

3. The information recording device according to claim 2 further comprising a time-notification unit computing, when the received closing command does not contain the close function indicating the command of minimum-amount lead-out data write request, a time needed to write the lead-out data to all the non-recorded regions of the recording medium, and the time-notification unit transmitting the computed time to a host computer.

4. The information recording device according to claim 1 further comprising a data-area writing unit writing, when a non-recorded region remains in the data areas of the recording medium, the lead-out data to the non-recorded region in the data areas during a time no data-accessing command is received from a host computer.

5. An information recording method which records user data in a recording medium having two or more recording layers and having a data area in which user data is recordable for each recording layer, comprising the steps of:
   receiving a closing command after recording of user data in the data areas of the recording medium is performed in response to a user-data write request; and
   writing a minimum amount of lead-out data to the recording medium following an end position of the recorded user data in the data areas of the recording medium, based on the received closing command, wherein the step of writing is provided to write the minimum amount of lead-out data to the recording medium when the received closing command contains a close function indicating a command of minimum-amount lead-out data write request.

6. The information recording method according to claim 5 wherein the step of writing is provided to write lead-out data to all non-recorded regions of the recording medium following the end position of the recorded user data in the data areas when the received closing command does not contain a close function indicating a command of minimum-amount lead-out data write request.

7. The information recording method according to claim 6 further comprising the steps of:
   computing, when the received closing command does not contain the close function indicating the command of minimum-amount lead-out data write request, a time needed to write the lead-out data to all the non-recorded regions of the recording medium; and transmitting the computed time to a host computer.

8. The information recording method according to claim 5 further comprising the step of writing, when a non-recorded region remains in the data areas of the recording medium, the lead-out data to the non-recorded region in the data areas during a time no data-accessing command is received from a host computer.

9. A computer-readable medium having a program embodied therein for causing a computer of an information recording device to execute an information recording method which records user data in a recording medium having two or more recording layers and having a data area in which user data is recordable for each recording layer, the method comprising the steps of:

receiving a closing command after recording of user data in the data areas of the recording medium is performed in response to a user-data write request; and writing a minimum amount of lead-out data to the recording medium following an end position of the recorded user data in the data areas of the recording medium, based on the received closing command, wherein the step of writing is provided to write the minimum amount of lead-out data to the recording medium when the received closing command contains a close function indicating a command of minimum-amount lead-out data write request.

10. The computer-readable medium according to claim 9 wherein the step of writing is provided to write lead-out data to all non-recorded regions of the recording medium following the end position of the recorded user data in the data areas when the received closing command does nor contain a close function indicating a command of minimum-amount lead-out data write request.

11. The computer-readable medium according to claim 10 wherein the method further comprises the steps of:

computing, when the received closing command does not contain the close function indicating the command of minimum-amount lead-out data write request, a time needed to write the lead-out data to all the non-recorded regions of the recording medium; and transmitting the computed time to a host computer.

12. The computer-readable medium according to claim 9 wherein the method further comprises the step of writing, when a non-recorded region remains in the data areas of the recording medium, the lead-out data to the non-recorded region in the data areas during a time no data-accessing command is received from a host computer.

13. An information recording method which records user data in a rewritable recording medium having a plurality of recording layers, the information recording method comprising the steps of:

recording user data in data areas spanning the plurality of recording layers of the recording medium;

determining, when writing lead-out data extending from an end of the data areas where the user data is recorded to an end of a lead-out area in the recording medium, whether a non-recorded region exists in an area following the end of the lead-out area;

writing, when the non-recorded region does not exist, only said lead-out data to the recording medium; and writing, when the non-recorded region exists, said lead-out data, and additional lead-out data covering the non-recorded region, to the recording medium.

14. The information recording method according to claim 13 wherein the step of determining whether the non-recorded region exists is performed by an RF check.

15. An information recording device which records user data in a rewritable recording medium having a plurality of recording layers, the information recording device comprising:

a recording unit for recording user data in data areas spanning the plurality of recording layers of the recording medium; and a determination unit for determining, when writing lead-out data extending from an end of the data areas where the user data is recorded to an end of a lead-out area in the recording medium, whether a non-recorded region exists in an area following the end of the lead-out area, wherein the recording unit is configured to write, when the non-recorded region does not exist, only said lead-out data to the recording medium, and to write, when the non-recorded region exists, said lead-out data, and additional lead-out data covering the non-recorded region, to the recording medium.

16. The information recording device according to claim 15 wherein the determination unit determines whether the non-recorded region exists by an RF check.

17. A computer-readable medium having a program embodied therein for causing a computer of an information recording device to execute an information recording method which records user data in a rewritable recording medium having a plurality of recording layers, the information recording method comprising the steps of:

recording user data in data areas spanning the plurality of recording layers of the recording medium;

determining, when writing lead-out data extending from an end of the data areas where the user data is recorded to an end of a lead-out area in the recording medium, whether a non-recorded region exists in an area following the end of the lead-out area;

writing, when the non-recorded region does not exist, only said lead-out data to the recording medium; and writing, when the non-recorded region exists, said lead-out data, and additional lead-out data covering the non-recorded region, to the recording medium.

18. The computer-readable medium according to claim 17 wherein the step of determining whether the non-recorded region exists is performed by an RF check.

* * * * *